UNITED STATES PATENT OFFICE.

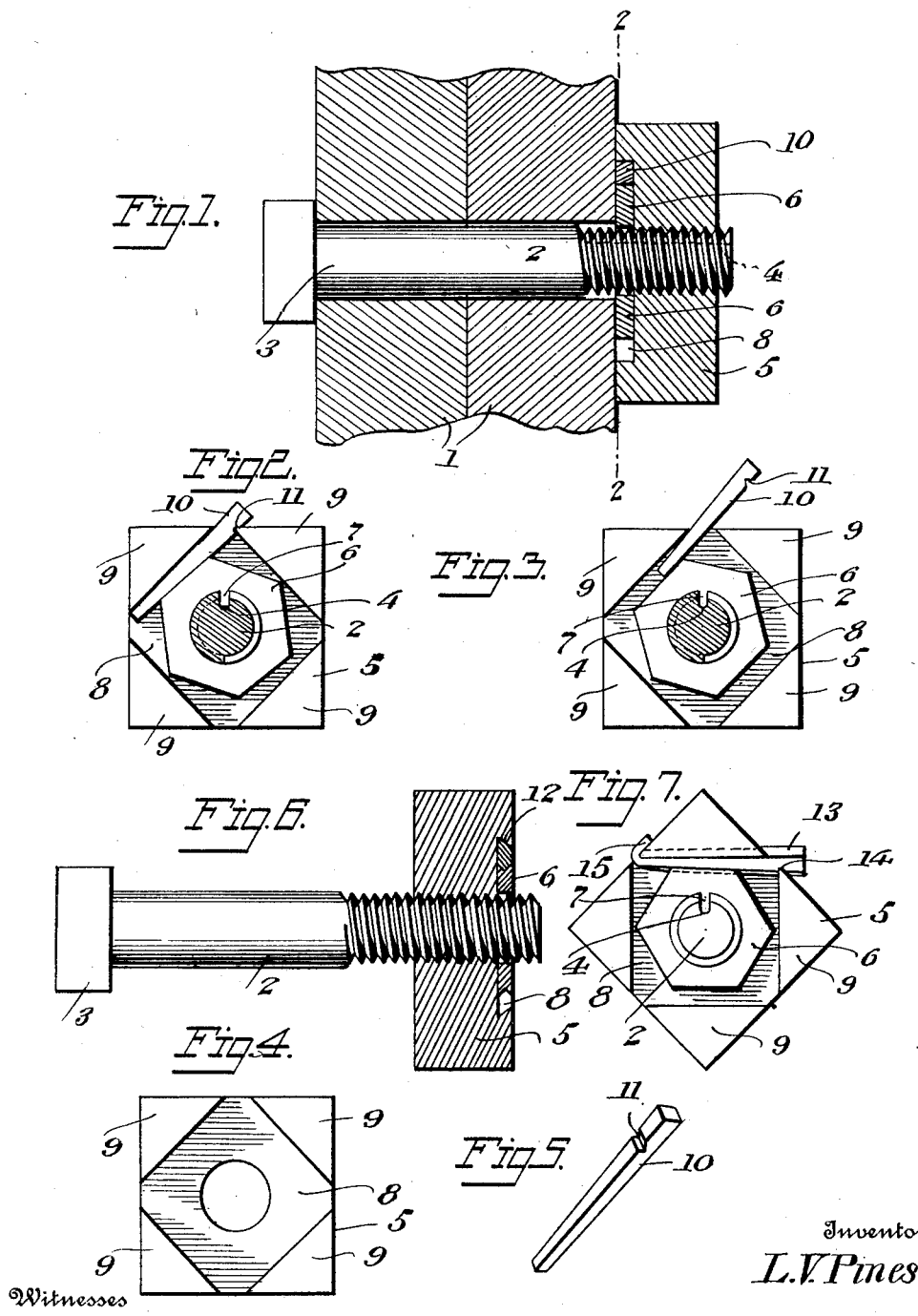

LEWIS VICTOR PINES, OF MILLERSBURG, PENNSYLVANIA.

NUT-LOCK.

1,107,106.      Specification of Letters Patent.      Patented Aug. 11, 1914.

Application filed December 16, 1913. Serial No. 807,129.

*To all whom it may concern:*

Be it known that I, LEWIS VICTOR PINES, a citizen of the United States, residing at Millersburg, in the county of Dauphin and State of Pennsylvania, have invented new and useful Improvements in Nut-Locks, of which the following is a specification.

The present invention relates to means for securing a nut and bolt in locked position, and resides in the construction, combination and arrangement of parts set forth in the following specification and falling within the scope of the appended claims.

In the drawing: Figure 1 is a transverse sectional view taken through plates connected by a nut and bolt constructed in accordance with the present invention and provided with the improved locking means, Fig. 2 is a sectional view on the line 2—2 of Fig. 1, Fig. 3 is a similar sectional view but illustrating the key being inserted to lock the nut and bolt, Fig. 4 is an inner face view of the nut, Fig. 5 is a perspective view of the locking key, and Fig. 6 is a section taken diagonally through a nut having the bolt and lock plate arranged thereon and sustained upon the bolt by a modified form of key, Fig. 7 is a front elevation of the structure illustrated in Fig. 6.

In the drawing, I have illustrated two plates indicated by the numeral 1 through which passes the shank 2 of a headed bolt 3. The shank, from its threaded end, is provided with a longitudinally extending groove 4, and threaded upon the shank is a nut 5. Arranged upon the shank between the nut and one of the plates 1, is a flat locking plate 6 which has a central opening through which the bolt passes and which has an inturned tongue 7 that is arranged within the groove 4 of the bolt. The plate 6 has an outer perimeter which provides a number of faces, that illustrated in the drawing being of hexagonal shape. The inner face of the nut 5 is formed with a squared depression 8, the walls provided thereby being disposed angularly of the sides of the nut, so that each of the corners of the nut provide a substantially triangular extension 9, a space being left between the opposite edges of the triangular corners.

Adapted to be guided by the inner angular wall of one of the corners and to contact with one of the sides or faces of the lock plate 6 is a wedge key 10, the enlarged or widened end of the same being formed with a notch 11 which, when the key has been forced through the passage provided between one of the corners of the nut and one of the faces of the lock plate and forced into tight frictional engagement between the said faces, engages with the edge of the adjacent enlarged corner 9 and so retains the nut locked upon the lock plate and bolt through the medium of its tongue 7 in the groove of the bolt.

The depressed face of the nut is primarily adapted, as heretofore stated, to be arranged adjacent one of the plates 1, but occasion may arise wherein it is desirable to arrange the locking plate to the outer face of the nut, in which instance, the face of the nut provided with the depression 8 is turned outwardly, and the inner walls provided by the corners thereof are beveled inwardly, as indicated by the numerals 12. The key has one of its sides beveled or inclined, as at 13, so that the same will be received within the beveled wall 12 of the corner, while its straight face or wall engages with the straight face upon the perimeter of the locking member 6. The key may be provided with a notch 14, similar to the notch 11, and adapted to engage the longitudinal edge of the adjacent corner of the nut to that with which the beveled edge of the key engages, and also the tapered end of the key may be bent over the side of the nut, as indicated by the numeral 15 and shown in Fig. 7 of the drawing.

From the above description, taken in connection with the accompanying drawings, the simplicity of the device, as well as the advantages thereof will, it is thought, be perfectly apparent to those skilled in the art to which such inventions appertain without further detailed description.

Having thus described the invention, what I claim is:

1. In combination, a bolt having its shank provided with a groove, a locking plate provided with an opening and a tongue projecting within the opening and engaging with the groove in the bolt, a nut for the bolt, said nut having its inner face provided with a depression which communicates with its sides, a wedge-shaped key adapted to be driven longitudinally through the opening formed by the depression upon one of the sides of the nut to engage with one of the sides of the locking plate to sustain the locking plate upon the nut and its tongue in engagement with the groove of the bolt.

2. In a nut lock, a bolt having a groove, a nut upon the bolt, said nut having one of its faces formed with a square depression providing the said face with corners which do not contact, a lock plate having a bolt opening, a tongue extending within the opening and arranged within the groove of the bolt when the lock plate is passed over the bolt and disposed within the depressed portion of the nut, a wedge-shaped key adapted to be inserted between two of the corners of the nut and arranged in contacting relation with one of the said corners and with one of the sides of the locking plate, said key having a notch adjacent one of its ends for engaging with the edge of the corner of the nut adjacent that contacted by the said wedge key.

3. In combination, a bolt having a longitudinal groove, a nut for the bolt, said nut having one of its faces formed with a squared recess to provide the said face with corners and spaces between the corners, the inner walls of the corners being beveled, a locking plate having its peripheral edges formed with V-shaped channels and having a central opening whereby the same is passed over the bolt and received within the recess in the nut, the locking plate having a tongue projecting within the opening and arranged within the groove of the bolt, a malleable key which is substantially rectangular in cross section and having one of its corners arranged within one of the V-shaped channels in one of the edges of the locking plate and its opposite corner engaged within the inclined wall provided in one of the corners of the nut, and the said key having one of its ends extending through one of the spaces between the corners of the nut and brought into engagement with one of the faces of said nut.

In testimony whereof I affix my signature in presence of two witnesses.

LEWIS VICTOR PINES.

Witnesses:
  Sue. Miller,
  Chas. A. Miller.

---

Copies of this patent may be obtained for five cents each, by addressing the "Commissioner of Patents, Washington, D. C."